(12) United States Patent
Chuang

(10) Patent No.: US 6,404,559 B1
(45) Date of Patent: Jun. 11, 2002

(54) TWIN-LENS PROJECTION DISPLAY

(75) Inventor: Fu-Ming Chuang, Hsin-Chu Hsien (TW)

(73) Assignee: Prokia Technology Co., Ltd. (TW)

( * ) Notice: Subject to any disclaimer, the term of this patent is extended or adjusted under 35 U.S.C. 154(b) by 0 days.

(21) Appl. No.: 09/789,976

(22) Filed: Feb. 20, 2001

(51) Int. Cl.$^7$ .......................... G02B 27/14; G03B 21/00
(52) U.S. Cl. ...................... 359/637; 359/634; 353/31
(58) Field of Search .................. 359/634, 636, 359/637, 638, 639, 640, 649, 618; 353/37, 31, 33; 348/335, 336, 337, 338, 339

(56) References Cited

U.S. PATENT DOCUMENTS

| | | | |
|---|---|---|---|
| 5,575,548 A | * | 11/1996 | Lee ............................... 353/31 |
| 5,907,434 A | * | 5/1999 | Sekine et al. ............... 359/462 |
| 6,280,034 B1 | * | 8/2001 | Brennesholtz ............... 353/20 |
| 6,283,597 B1 | * | 9/2001 | Jorke .......................... 353/31 |

* cited by examiner

Primary Examiner—Georgia Epps
Assistant Examiner—Saeed Seyrafi
(74) Attorney, Agent, or Firm—Webb Ziesenheim Logsdon Orkin & Hanson, P.C.

(57) ABSTRACT

A twin-lens projection display includes a dichroic synthesizing prism and an optical path compensating prism. First and second light modulators, which are disposed adjacent to first and second input sides of the dichroic synthesizing prism, provide modulated first and second color components to the same. A third light modulator is disposed adjacent to an input side of the optical path compensating prism, and provides a modulated third color component thereto. A first projection lens receives the first and second color components from an output side of the dichroic synthesizing prism, whereas a second projector lens receives the third color component from an output side of the optical path compensating prism.

5 Claims, 6 Drawing Sheets

TWIN-LENS PROJECTION DISPLAY

BACKGROUND OF THE INVENTION

1. Field of the Invention

The invention relates to a projection display, more particularly to a twin-lens projection display.

2. Description of the Related Art

Referring to FIG. 1, a conventional single-lens projection display 1 is shown to comprise a light source 11, an integrator 12 disposed in front of the light source 11, a dichroic mirror set 13 disposed in front of the integrator 12, a color synthesizing prism 14 disposed in front of the dichroic mirror set 13, three liquid crystal light valves 16 disposed respectively on the left and right sides and the rear side of the color synthesizing prism 14, and two reflective mirror sets 17 disposed respectively adjacent to the left and right sides of the dichroic mirror set 13 and left and right ones of the light valves 16.

In operation, light from the light source 11 passes through the integrator 12 to result in a forwardly directed light beam which is split into primary color components, such as red, green and blue color components, by the dichroic mirror set 13. Each of the primary color components is modulated by a respective one of the light valves 16. Two of the primary color components reach the respective light valve 16 via a respective one of the reflective mirror sets 17. The modulated color components from the light valves 16 are synthesized by the color synthesizing prism 14 for projection by a projection lens 15 so as to form an image on a display screen (not shown).

The color synthesizing prism 14 of the projection display 1 is generally formed from four right-angle prisms, thereby arising in the following drawbacks:

1. The color synthesizing prism 14 is difficult to manufacture in view of the high precision requirement for the four right-angle prisms. If the color synthesizing prism 14 is not precisely formed, the magnification factors for the primary color components will differ from each other, thereby preventing proper overlaying of the color components when forming an image on the display screen.

2. Existing pixel sizes require the cementing lines of the four right-angle prisms to be no thicker than 5 microns so as not to adversely affect the image on the display screen. In the event of an eventual improvement in the resolution of liquid crystal light valves, the cementing lines will unavoidably result in deterioration of the image quality.

3. The color synthesizing prism has an inherent light leakage drawback, which distorts signals of thin film transistors at the back of a liquid crystal display panel that can prevent accurate image formation by a liquid crystal optical projection system.

Referring to FIG. 2, in a conventional triple-lens projection display 2, primary color components are directed to three liquid crystal light valves 21, 22, 23 for modulation. The modulated color components are received by three projection lenses 24, 25, 26, which cooperate to form an image on a display screen 27. The design of the projection display 2 requires the positions of the light valves 21, 22, 23 to be properly offset from the respective projection lens 24, 25, 26 so that image color components can be appropriately combined to form an image on the display screen 27. This complicates the manufacture of the conventional triple-lens projection display 2.

SUMMARY OF THE INVENTION

Therefore, the main object of the present invention is to provide a twin-lens projection display that can be manufactured with relative ease and at a relatively low cost.

According to the present invention, a twin-lens projection display comprises:

a color separating mirror set adapted to separate input light into first, second and third color components;

a dichroic synthesizing prism having a first input side, a second input side, and an output side;

an optical path compensating prism having an input side and an output side;

a first light modulator for modulating the first color component from the color separating mirror set, the first light modulator being disposed adjacent to the first input side of the dichroic synthesizing prism, and providing the modulated first color component thereto, the dichroic synthesizing prism outputting the modulated first color component at the output side thereof;

a second light modulator for modulating the second color component from the color separating mirror set, the second light modulator being disposed adjacent to the second input side of the dichroic synthesizing prism, and providing the modulated second color component thereto, the dichroic synthesizing prism outputting the modulated second color component at the output side thereof;

a third light modulator for modulating the third color component from the color separating mirror set, the third light modulator being disposed adjacent to the input side of the optical path compensating prism, and providing the modulated third color component thereto, the optical path compensating prism outputting the modulated third color component at the output side thereof;

a first projection lens disposed adjacent to the output side of the dichroic synthesizing prism so as to receive the modulated first and second color components therefrom; and a second projection lens disposed adjacent to the output side of the optical path compensating prism so as to receive the modulated third color component therefrom.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
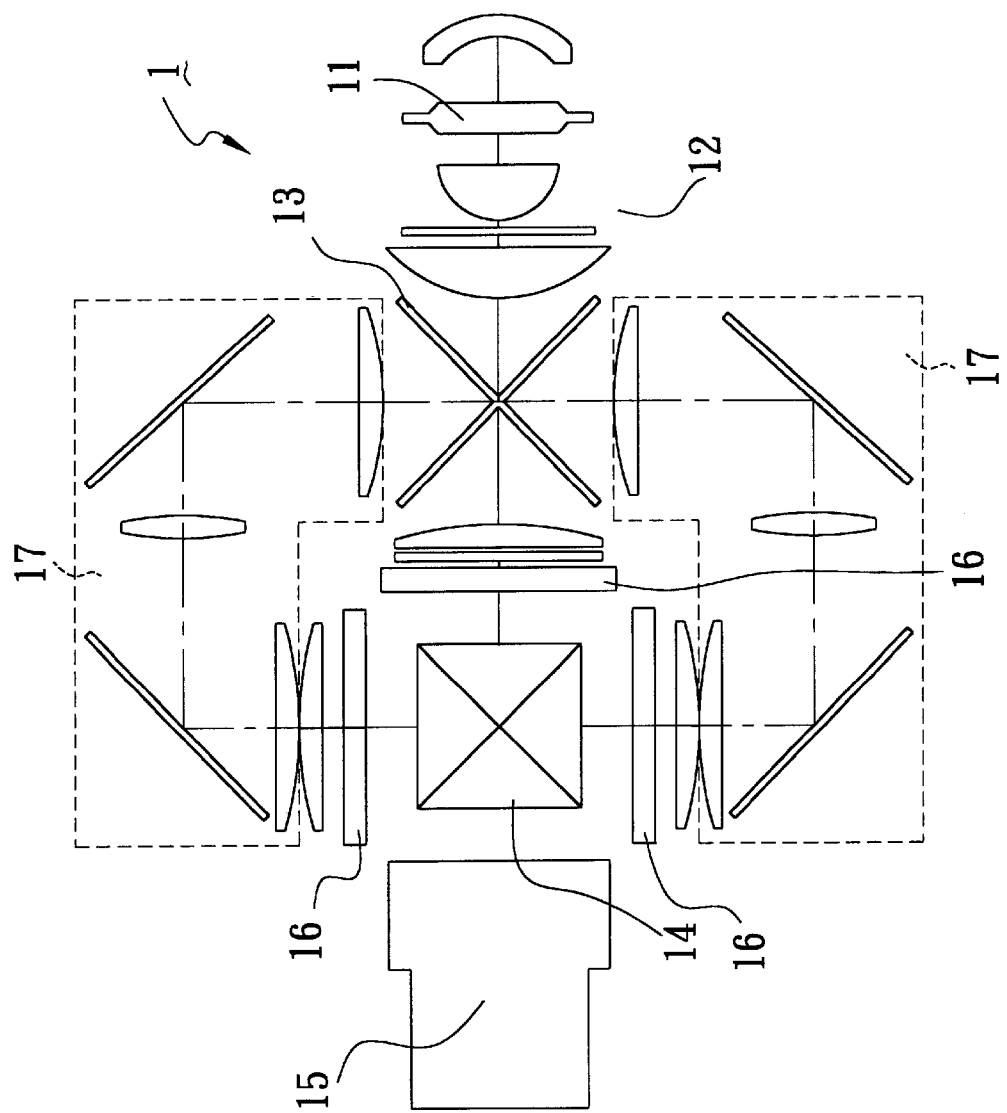
FIG. 1 illustrates a conventional single-lens projection display.
Figure 2:
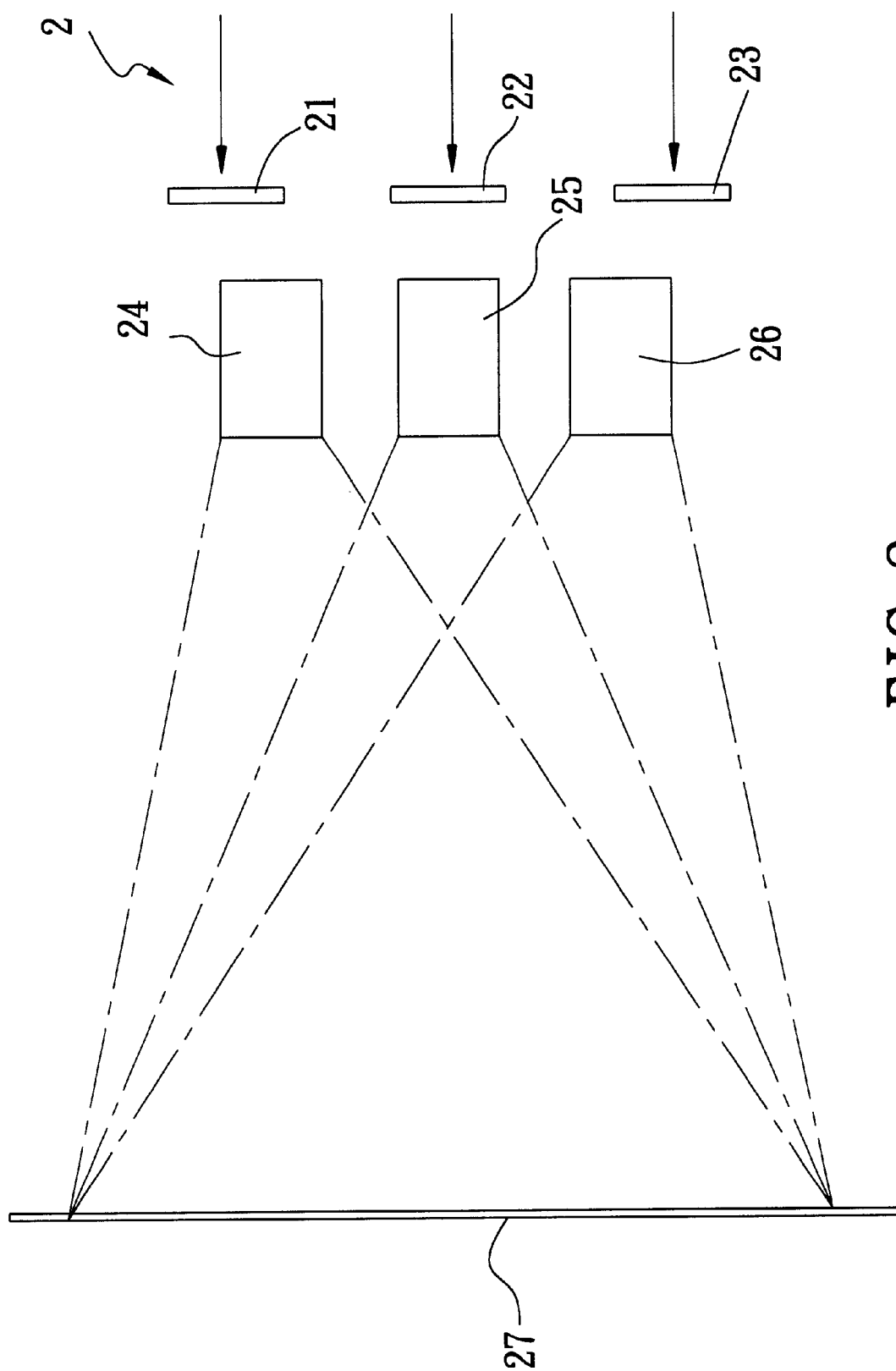
FIG. 2 is a simplified diagram of a conventional triple-lens projection display.
Figure 3:
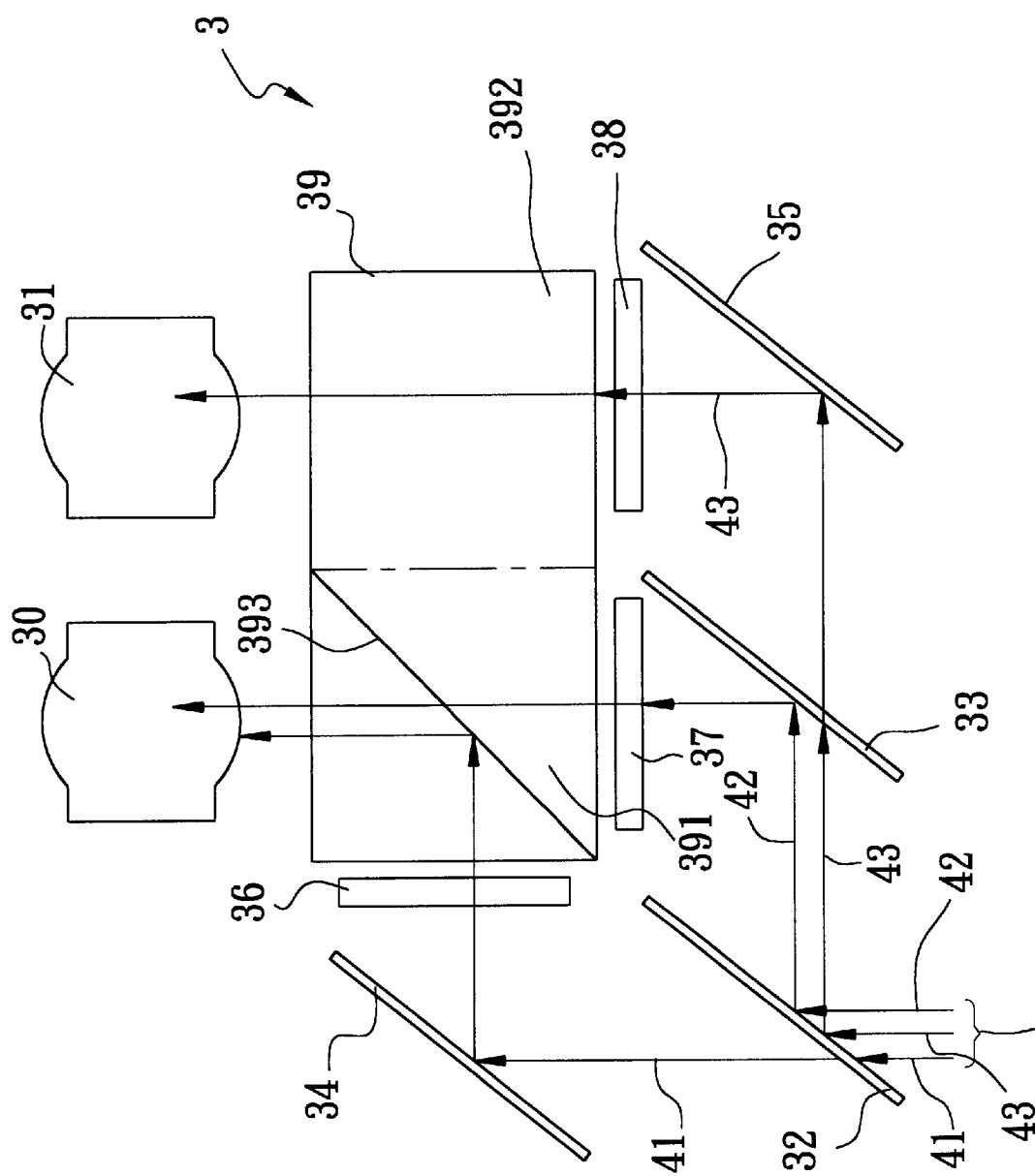
FIG. 3 illustrates the first preferred embodiment of a twin-lens projection display according to the present invention.

Referring to FIG. 3, the first preferred embodiment of a twin-lens projection display 3 according to this invention is shown to comprise a color separating mirror set, a first light modulator 36, a second light modulator 37, a third light modulator 38, a color synthesizing prism 39, a first projection lens 30, and a second projection lens 31. In this embodiment, the color separating mirror set is constituted by a first dichroic mirror 32, a second dichroic mirror 33, a first reflective mirror 34, and a second reflective mirror 35. Preferably, each of the first, second and third light modulators 36, 37, 38 includes a liquid crystal light valve.

The first dichroic mirror 32 is disposed at a predetermined angle at a rear side of the projection display 3 downstream of a light source (not shown), and is formed from a plurality of overlapping thin film layers having different refractive indices. By controlling the material, thickness and number of the thin film layers, incident light of a predetermined range of wavelength can be transmitted or reflected. As shown, white light 4, which is formed from three primary color components 41, 42, 43, such as red, green and blue color components, is incident upon the first dichroic mirror 32 with an incident angle of about 45 degrees. The first color component 41, such as the red color component, passes directly through the first dichroic mirror 32.

The second and third color components 42, 43, such as the green and blue color components, are reflected to the right by the first dichroic mirror 32 at a 90-degree angle.

The second dichroic mirror 33 is also capable of transmitting or reflecting incident light according to the wavelength thereof, and is disposed at a predetermined angle on the right side of the first dichroic mirror 32 along the path of the second and third color components 42, 43. In this embodiment, the second dichroic mirror 33 is parallel to the first dichroic mirror 32 such that the second and third color components 42, 43 are incident upon the second dichroic mirror 33 with an incident angle of about 45 degrees. The second color component 42, such as the green color component, is reflected forwardly by the second dichroic mirror 33 at a 90-degree angle. The third color component 43, such as the blue color component, passes directly through the second dichroic mirror 33.

The first reflective mirror 34 is disposed at a predetermined angle in front of the first dichroic mirror 32 along the path of the first color component 41. In this embodiment, the first reflective mirror 34 is disposed parallel to the first dichroic mirror 32 such that the first color component 41 is incident upon the first reflective mirror 34 with an incident angle of about 45 degrees. The first color component 41 is reflected to the right by the first reflective mirror 34 at a 90-degree angle.

The second reflective mirror 35 is disposed at a predetermined angle on the right side of the second dichroic mirror 33 along the path of the third color component 43. In this embodiment, the second reflective mirror 35 is disposed parallel to the second dichroic mirror 33 such that the third color component 43 is incident upon the second reflective mirror 35 with an incident angle of about 45 degrees. The third color component 43 is reflected forwardly by the second reflective mirror at a 90-degree angle.

In this embodiment, the color synthesizing prism 39 is formed as a rectangular block having a left dichroic synthesizing prism portion 391 with a left first input side, a front second input side and a rear output side, and a right optical path compensating prism portion 392 with a front input side and a rear output side. The dichroic synthesizing prism portion 391 is formed with a dichroic splitting interface 393 having a predetermined angle such that light of a predetermined wavelength can be transmitted or reflected. The first light modulator 36 is disposed adjacent to the first input side of the dichroic synthesizing prism portion 391, and serves to modulate the first color component 41 from the first reflective mirror 34. The second light modulator 37 is disposed adjacent to the second input side of the dichroic synthesizing prism portion 391, and serves to modulate the second color component 42 from the second dichroic mirror 33. The dichroic synthesizing prism portion 391 is configured such that the modulated first color component 41 from the first light modulator 36 is reflected forwardly by a 90-degree angle at the dichroic splitting interface 393 so as to pass through the output side of the dichroic synthesizing prism portion 391, whereas the modulated second color component 42 from the second light modulator 37 passes directly through the output side of the dichroic synthesizing prism portion 391. The third light modulator 38 is disposed adjacent to the input side of the optical path compensating prism portion 392, and serves to modulate the third color component 43 from the second reflective mirror 35. The optical path compensating prism portion 392, which is not provided with a dichroic splitting interface, is configured so as to receive the modulated third color component 43 from the third light modulator 38, and so as to allow the modulated third color component 43 to pass through the output side thereof. The optical path compensating prism portion 392 ensures that the optical path length of the third color component 43 is substantially equal to those of the first and second color components 41, 42 passing through the dichroic synthesizing prism portion 391.

The first projection lens 30 is disposed in front of the output side of the dichroic synthesizing portion 391 so as to receive the first and second color components 41, 42 from the latter and so as to project the first and second color components 41, 42 onto a display screen (not shown). The second projection lens 31 is disposed in front of the output side of the optical path compensating prism portion 392 so as to receive the third color component 43 from the same and so as to project the third color component 43 onto the display screen.

Figure 4:
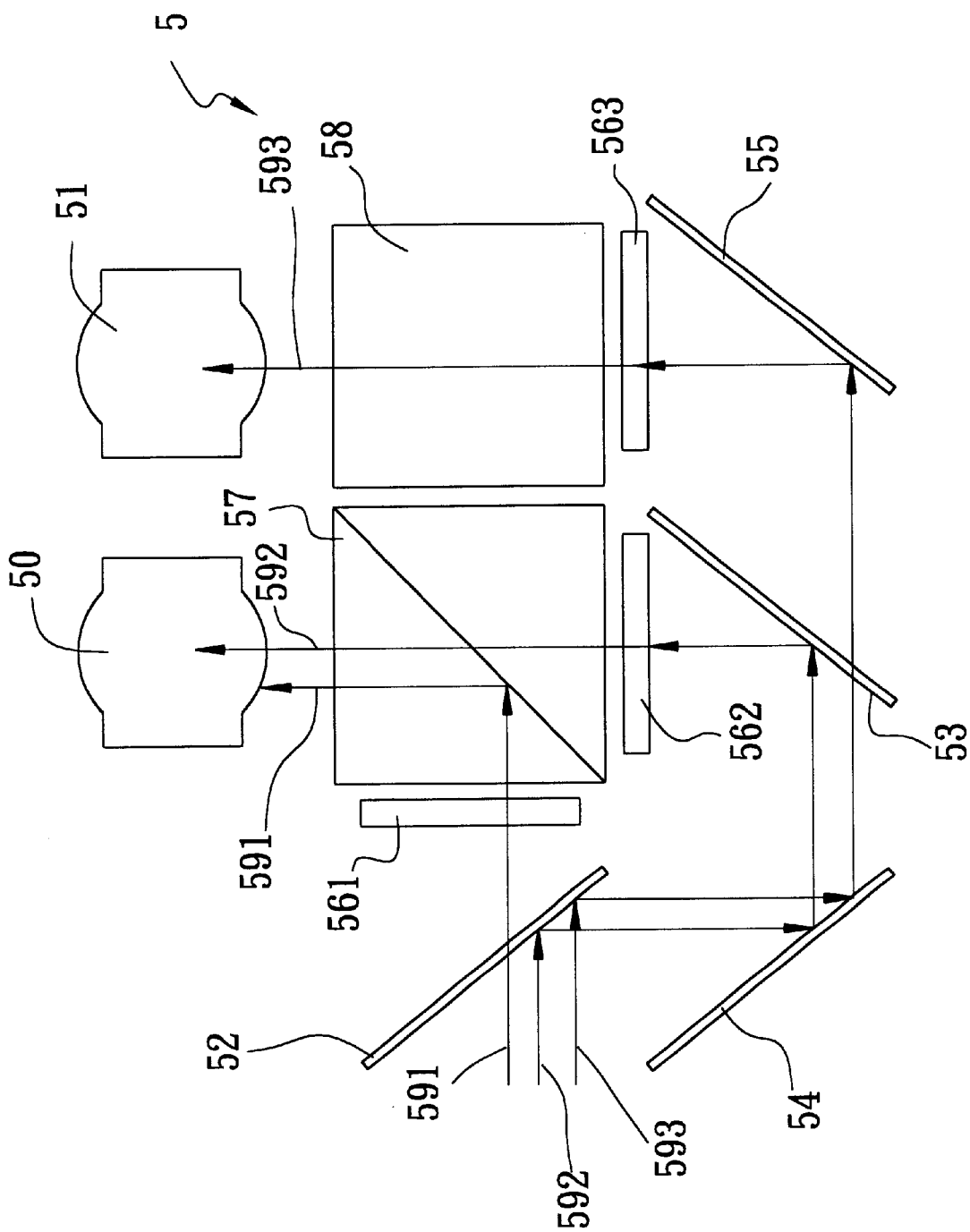
FIG. 4 illustrates the second preferred embodiment of a twin-lens projection display according to the present invention.
Figure 5:
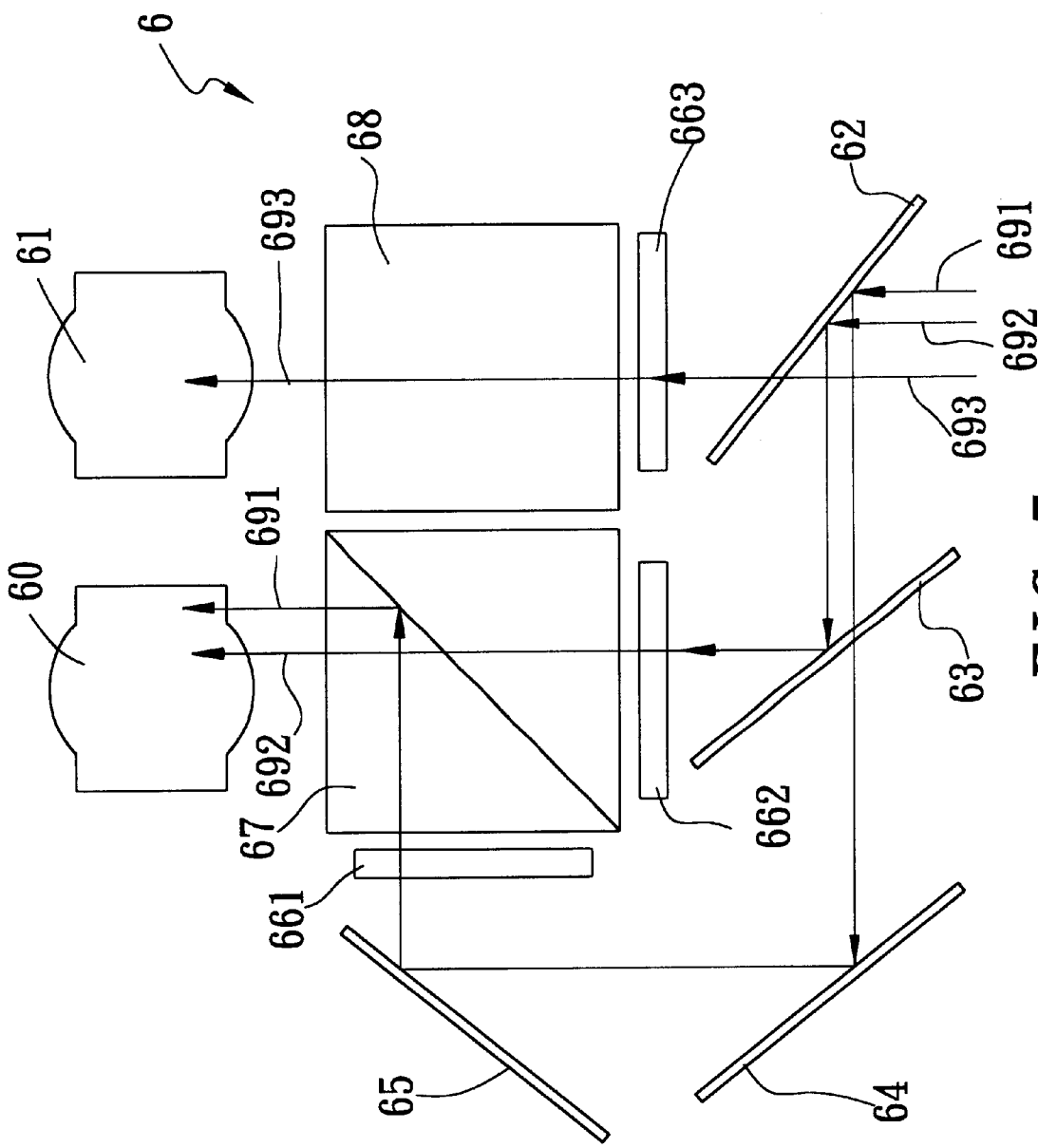
FIG. 5 illustrates the third preferred embodiment of a twin-lens projection display according to the present invention.
Figure 6:
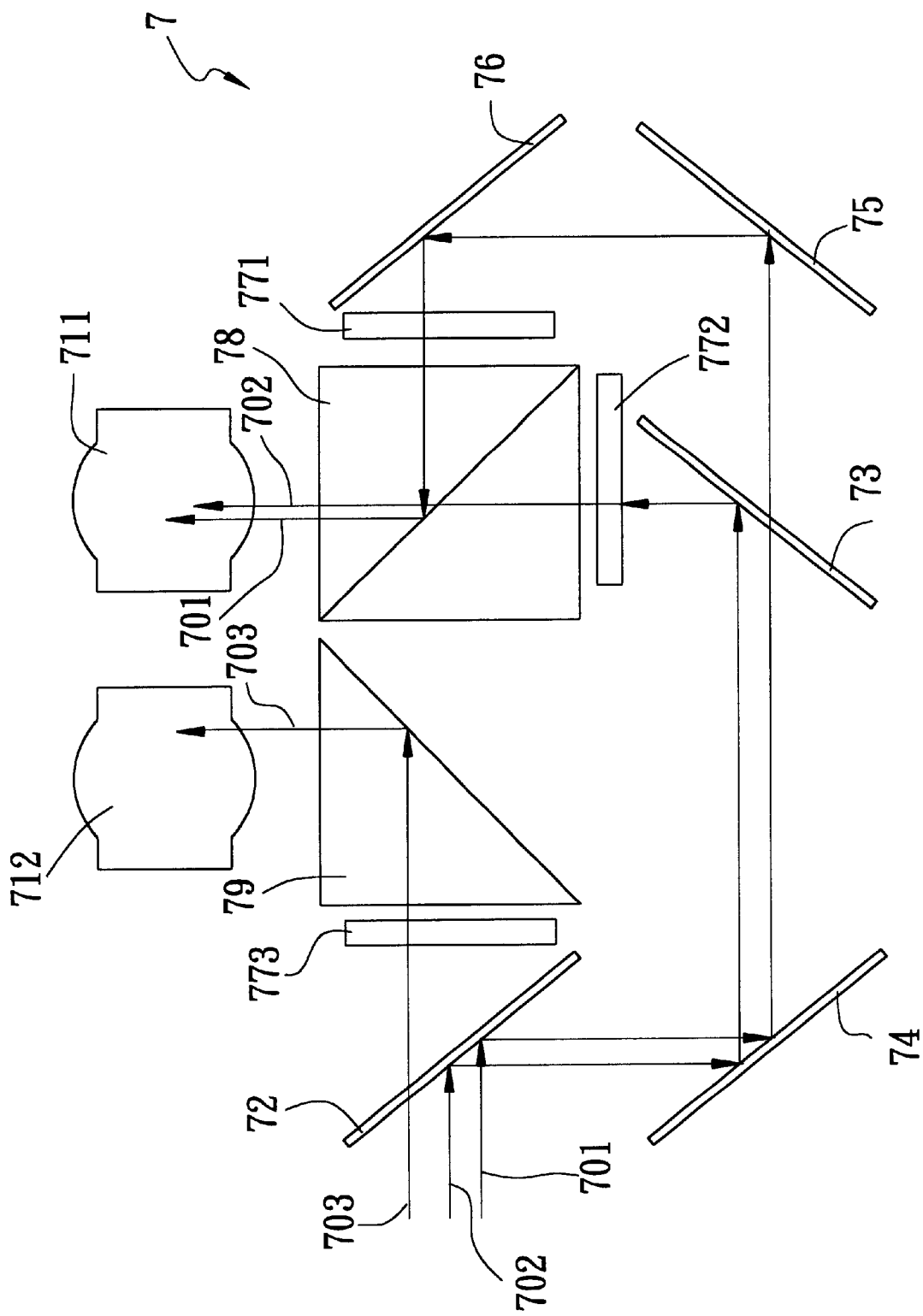
FIG. 6 illustrates the fourth preferred embodiment of a twin-lens projection display according to the present invention.

With reference to the following embodiments shown in FIGS. 4 to 6, it will be apparent to one skilled in the art that the particular configuration of the color separating mirror set is not essential to the present invention. The configuration of the color separating mirror set can be varied, as long as input light can be separated into three color components and can be directed to three light modulators, which are disposed respectively on input sides of a dichroic synthesizing prism and an optical path compensating prism, for modulation. In addition, the dichroic synthesizing prism portion 391 and the optical path compensating prism portion 392 of the color synthesizing prism 39 of the first preferred embodiment can be formed separately instead of being connected integrally to simplify fabrication of the same.

Referring to FIG. 4, the second preferred embodiment of a twin-lens projection display 5 according to this invention is shown to comprise a color separating mirror set, first, second and third light modulators 561, 562, 563, a dichroic synthesizing prism 57, an optical path compensating prism 58, a first projection lens 50, and a second projection lens 51. In this embodiment, the color separating mirror set includes a first dichroic mirror 52, a second dichroic mirror 53, a first reflective mirror 54 and a second reflective mirror 55. In addition, each of the first, second and third light modulators 561, 562, 563 is preferably a liquid crystal light valve.

The first dichroic mirror 52 is disposed at a predetermined angle at a left side of the projection display 5 downstream of a light source (not shown), and is adapted to separate white light from the light source into a first color component 591, which passes directly therethrough, and second and third color components 592, 593, which are reflected rearwardly at a 90-degree angle.

The first reflective mirror 54 is disposed at a predetermined angle rearwardly of the first dichroic mirror 52 along the path of the second and third color components 592, 593. The second and third color components 592, 593 are reflected to the right by the first reflective mirror 54 at a 90-degree angle.

The second dichroic mirror 53 is disposed at a predetermined angle on the right side of the first reflective mirror 54 along the path of the second and third color components 592, 593. The second color component 592 is reflected forwardly by the second dichroic mirror 53 at a 90-degree angle. The third color component 593 passes directly through the second dichroic mirror 53.

The second reflective mirror 55 is disposed at a predetermined angle on the right side of the second dichroic mirror 53 along the path of the third color component 593. The third color component 593 is reflected forwardly by the second reflective mirror 55 at a 90-degree angle.

The dichroic synthesizing prism 57 has a left first input side, a front second input side and a rear output side. The first light modulator 561 is disposed adjacent to the first input side of the dichroic synthesizing prism 57, and serves to modulate the first color component 591 from the first dichroic mirror 52. The second light modulator 562 is disposed adjacent to the second input side of the dichroic synthesizing prism 57, and serves to modulate the second color component 592 from the second dichroic mirror 53. The dichroic synthesizing prism 57 is configured such that the modulated first color component 591 from the first light modulator 561 is reflected forwardly by a 90-degree angle at a dichroic splitting interface thereof so as to pass through the output side of the dichroic synthesizing prism 57, whereas the modulated second color component 592 from the second light modulator 562 passes directly through the output side of the dichroic synthesizing prism 57.

The optical path compensating prism 38 has a front input side and a rear output side. The third light modulator 563 is disposed adjacent to the input side of the optical path compensating prism 58, and serves to modulate the third color component 593 from the second reflective mirror 55. The optical path compensating prism 58 receives the modulated third color component 593 from the third light modulator 563, and allows the modulated third color component 593 to pass through the output side thereof.

The first projection lens 50 is disposed in front of the output side of the dichroic synthesizing prism 57 so as to receive the first and second color components 591, 592 from the latter and so as to project the first and second color components 591, 592 onto a display screen (not shown). The second projection lens 51 is disposed in front of the output side of the optical path compensating prism 58 so as to receive the third color component 593 from the same and so as to project the third color component 593 onto the display screen.

Referring to FIG. 5, the third preferred embodiment of a twin-lens projection display 6 according to this invention is shown to comprise a color separating mirror set, first, second and third light modulators 661, 662, 663, a dichroic synthesizing prism 67, an optical path compensating prism 68, a first projection lens 60, and a second projection lens 61. In this embodiment, the color separating mirror set includes a first dichroic mirror 62, a second dichroic mirror 63, a first reflective mirror 64, and a second reflective mirror 65. Preferably, each of the first, second and third light modulators 661, 662, 663 includes a liquid crystal light valve.

The first dichroic mirror 62 is disposed at a predetermined angle at a rear side of the projection display 6 downstream of a light source (not shown), and is adapted to separate white light from the light source into first and second color components 691, 692, which are reflected to the left at a 90-degree angle, and a third color component 693, which passes directly therethrough.

The second dichroic mirror 63 is disposed at a predetermined angle on the left side of the first dichroic mirror 62 along the path of the first and second color components 692, 693. The second color component 692 is reflected forwardly by the second dichroic mirror 63 at a 90-degree angle. The first color component 691 passes directly through the second dichroic mirror 63.

The first reflective mirror 64 is disposed at a predetermined angle on the left side of the second dichroic mirror 63 along the path of the first color component 691. The first color component 691 is reflected forwardly by the first reflective mirror 64 at a 90-degree angle.

The second reflective mirror 65 is disposed at a predetermined angle in front of the first reflective mirror 64 along the path of the first color component 691. The first color component 691 is reflected to the right by the second reflective mirror 65 at a 90-degree angle.

The dichroic synthesizing prism 67 has a left first input side, a front second input side and a rear output side. The first light modulator 661 is disposed adjacent to the first input side of the dichroic synthesizing prism 67, and serves to modulate the first color component 691 from the second reflective mirror 65. The second light modulator 662 is disposed adjacent to the second input side of the dichroic synthesizing prism 67, and serves to modulate the second color component 692 from the second dichroic mirror 63. The dichroic synthesizing prism 67 is configured such that the modulated first color component 691 from the first light modulator 661 is reflected forwardly by a 90-degree angle at a dichroic splitting interface thereof so as to pass through the output side of the dichroic synthesizing prism 67, whereas the modulated second color component 692 from the second light modulator 662 passes directly through the output side of the dichroic synthesizing prism 67.

The optical path compensating prism 68 has a front input side and a rear output side. The third light modulator 663 is disposed adjacent to the input side of the optical path compensating prism 68, and serves to modulate the third color component 693 from the first dichroic mirror 62. The optical path compensating prism 68 receives the modulated third color component 693 from the third light modulator 663, and allows the modulated third color component 693 to pass through the output side thereof.

The first projection lens 60 is disposed in front of the output side of the dichroic synthesizing prism 67 so as to receive the first and second color components 691, 692 from the latter and so as to project the first and second color components 691, 692 onto a display screen (not shown). The second projection lens 61 is disposed in front of the output side of the optical path compensating prism 68 so as to receive the third color component 693 from the same and so as to project the third color component 693 onto the display screen.

Referring to FIG. 6, the fourth preferred embodiment of a twin-lens projection display 7 according to this invention is shown to comprise a color separating mirror set, first, second and third light modulators 771, 772, 773, a dichroic synthesizing prism 78, an optical path compensating prism 79, a first projection lens 711, and a second projection lens 712. In this embodiment, the color separating mirror set includes a first dichroic mirror 72, a second dichroic mirror 73, a first reflective mirror 74, a second reflective mirror 75, and a third reflective mirror 76. Preferably, each of the first, second and third light modulators 771, 772, 773 includes a liquid crystal light valve.

The first dichroic mirror 72 is disposed at a predetermined angle at a left side of the projection display 7 downstream of a light source (not shown), and is adapted to separate white light from the light source into first and second color components 701, 702, which are reflected rearwardly at a 90-degree angle, and a third color component 703, which passes; directly therethrough.

The first reflective mirror 74 is disposed at a predetermined angle rearwardly of the first dichroic mirror 72 along the path of the first and second color components 701, 702. The first and second color components 701, 702 are reflected to the right by the first reflective mirror 74 at a 90-degree angle.

The second dichroic mirror 73 is disposed at a predetermined angle on the right side of the first reflective mirror 74 along the path of the first and second color components 701, 702. The second color component 702 is reflected forwardly by the second dichroic mirror 73 at a 90-degree angle. The first color component 701 passes directly through the second dichroic mirror 73.

The second reflective mirror 75 is disposed at a predetermined angle on the right side of the second dichroic mirror 73 along the path of the first color component 701. The first color component 701 is reflected forwardly by the second reflective mirror 75 at a 90-degree angle.

The third reflective mirror 76 is disposed at a predetermined angle in front of the second reflective mirror 75 along the path of the first color component 701. The first color component 701 is reflected to the left by the third reflective mirror 76 at a 90-degree angle.

The dichroic synthesizing prism 78 has a right first input side, a front second input side and a rear output side. The first light modulator 771 is disposed adjacent to the first input side of the dichroic synthesizing prism 78, and serves to modulate the first color component 701 from the third reflective mirror 76. The second light modulator 772 is disposed adjacent to the second input side of the dichroic synthesizing prism 78, and serves to modulate the second color component 702 from the second dichroic mirror 73. The dichroic synthesizing prism 78 is configured such that the modulated first color component 701 from the first light modulator 771 is reflected forwardly by a 90-degree angle at a dichroic splitting interface thereof so as to pass through the output side of the dichroic synthesizing prism 78, whereas the modulated second color component 702 from the second light modulator 772 passes directly through the output side of the dichroic synthesizing prism 78.

The optical path compensating prism 79 has a left input side and a rear output side. The third light modulator 773 is disposed adjacent to the input side of the optical path compensating prism 79, and serves to modulate the third color component 703 from the first dichroic mirror 72. The optical path compensating prism 79 receives the modulated third color component 703 from the third light modulator 773, and directs the modulated third color component 703 to pass through the output side thereof.

The first projection lens 711 is disposed in front of the output side of the dichroic synthesizing prism 78 so as to receive the first and second color components 701, 702 from the latter and so as to project the first and second color components 701, 702 onto a display screen (not shown). The second projection lens 712 is disposed in front of the output side of the optical path compensating prism 79 so as to receive the third color component 703 from the same and so as to project the third color component 703 onto the display screen.

It is noted that the dichroic synthesizing prism employed in the twin-lens projection display of this invention is easier and less costly to fabricate than the color synthesizing prism, which is formed from four right-angle prisms, of the aforesaid conventional single-lens projection display. In addition, by simply adjusting the relative position offset between one of the projection lenses (such as the second projection lens) and one of the light modulators (such as the third light modulator), the image projected by said one of the projection lenses can be properly combined with that projected by the other one of the projection lenses, thereby resulting in a simpler design as compared to the aforesaid conventional triple-lens projection display.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A twin-lens projection display, comprising:

a color separating mirror set adapted to separate input light into first, second and third color components;

a dichroic synthesizing prism having a first input side, a second input side, and an output side;

an optical path compensating prism having an input side and an output side;

a first light modulator for modulating the first color component from said color separating mirror set, said first light modulator being disposed adjacent to said first input side of said dichroic synthesizing prism, and providing the modulated first color component thereto, said dichroic synthesizing prism outputting the modulated first color component at said output side thereof;

a second light modulator for modulating the second color component from said color separating mirror set, said second light modulator being disposed adjacent to said second input side of said dichroic synthesizing prism, and providing the modulated second color component thereto, said dichroic synthesizing prism outputting the modulated second color component at said output side thereof;

a third light modulator for modulating the third color component from said color separating mirror set, said third light modulator being disposed adjacent to said input side of said optical path compensating prism, and providing the modulated third color component thereto, said optical path compensating prism outputting the modulated third color component at said output side thereof;

a first projection lens disposed adjacent to said output side of said dichroic synthesizing prism so as to receive the modulated first and second color components therefrom; and a second projection lens disposed adjacent to said output side of said optical path compensating prism so as to receive the modulated third color component therefrom.

2. The twin-lens projection display of claim 1, wherein the first, second and third color components are primary color components.

3. The twin-lens projection display of claim 1, wherein said color separating mirror set includes first and second dichroic mirrors which cooperate to separate the input light into the first, second and third color components.

4. The twin-lens projection display of claim 1, wherein said dichroic synthesizing prism and said optical path compensating prism are connected integrally to form a color synthesizing prism.

5. The twin-lens projection display of claim 1, wherein each of said first, second and third light modulators includes a liquid crystal light valve.

* * * * *